United States Patent [19]

Kubo et al.

[11] 4,337,329
[45] Jun. 29, 1982

[54] PROCESS FOR HYDROGENATION OF CONJUGATED DIENE POLYMERS

[75] Inventors: Yoichiro Kubo; Kiyomori Ohura, both of Yokohama, Japan

[73] Assignee: Nippon Zeon Co., Ltd., Tokyo, Japan

[21] Appl. No.: 210,688

[22] Filed: Nov. 26, 1980

[30] Foreign Application Priority Data

Dec. 6, 1979 [JP] Japan .................................. 54-158575
Dec. 6, 1979 [JP] Japan .................................. 54-158576

[51] Int. Cl.³ .............................................. C08F 8/04
[52] U.S. Cl. .................................................... 525/339
[58] Field of Search ......................................... 525/339

[56] References Cited

FOREIGN PATENT DOCUMENTS 54-77689 6/1979 Japan .
2011911 7/1979 United Kingdom .

Primary Examiner—William F. Hamrock
Attorney, Agent, or Firm—Sherman & Shalloway

[57] ABSTRACT

In a process which comprises catalytically hydrogenating the carbon-carbon double bonds of a conjugated diene polymer, the improvement which comprises using a catalyst composed of a porous powdery or granular carrier and supported thereon both Pd and at least one metal selected from the group consisting of the metals of Groups Ia, IIa, IIIa, IIIb, IVa, Va and VIa of the periodic table, Ge and Sb.

5 Claims, No Drawings

PROCESS FOR HYDROGENATION OF CONJUGATED DIENE POLYMERS

This invention relates to a process for hydrogenating a conjugated diene polymer using a Pd-containing catalyst having improved activity.

Catalysts composed of a metal of Group VIII of the periodic table supported on a porous carrier such as carbon, silica or alumina have generally been used to catalyze hydrogenation of the carbon-carbon double bonds of conjugated diene polymers. An unsaturated bond of a polymer is hydrogenated for the purpose of improving the properties of the polymer. If, however, the inherent properties of the polymer are degraded as a result of the hydrogenation, there is no significance in modifying the polymer by hydrogenation. For example, when modification of a styrene/butadiene random or block copolymer proceeds so far as to hydrogenate the benzene ring of styrene, the polymer will lose its rubber-like properties. In the case of an acrylonitrile/butadiene random or block copolymer, reduction of its nitrile group as a result of hydrogenation will markedly reduce the oil resistance of the copolymer. Accordingly, in so modifying a conjugated diene polymer, it is necessary to selectively hydrogenate only the double bonds of its conjugated diene portion. Noble metals such as Pt and Pd are frequently used as catalytic metals having such selectivity. Since these noble metals are expensive, they are desirably used in the smallest possible amounts in performing selective hydrogenation. Furthermore, because in hydrogenating a high-molecular-weight polymer in solvent, the viscosity of the system should be minimized in order to stir it well and perform uniform hydrogenation reaction. Consequently, the amount of the catalyst has to be decreased. It has been desired therefore to develop a catalyst having high activity and high selectivity.

It is an object of this invention therefore to provide a Pd-containing catalyst which has high activity in catalyzing hydrogenation of conjugated diene polymers and can selectively hydrogenate carbon-carbon double bonds in the main chain or side chains of the polymers.

On extensive investigation, the present inventors have found that when a conjugated diene polymer is hydrogenated by using a catalyst containing Pd and another metal supported together on a carrier, the catalyst shows much higher activity and much higher selectivity than a catalyst containing only Pd supported on a carrier.

Thus, the present invention provides a process for hydrogenating a conjugated diene polymer, which is characterized by using a catalyst prepared by supporting both Pd and at least one metal selected from the group consisting of the metals of Groups Ia, IIa, IIIa, IIIb, IVa, Va and VIa of the periodic table, Ge and Sb on a porous powdery or granular carrier such as carbon, silica or alumina.

The catalyst used in the process of this invention is prepared by supporting both Pd and at least one metal selected from the group consisting of the metals of Groups Ia, IIa, IIIa, IIIb, IVa, Va and VIa of the periodic table, Ge and Sb on a porous powdery or granular carrier, such as silica, silica-alumina, alumina, diatomaceous earth, activated carbon or carbon black used for rubber compounding or coloration. When used alone, the metals of Groups Ia, IIa and IIIa do not have hydrogenating ability. The metals of Groups IVa and Va, on the other hand, have little or no hydrogenating ability when used alone.

The above metals can be supported on the carrier by any ordinary supporting methods. For example, these metals can be supported in the elemental state on the carrier. Or the carrier may be dipped in an aqueous solution of a halide, oxide, hydroxide, acid chloride, sulfate, carbonate, etc. of these metals, followed by reduction to provide the desired catalyst.

The amount of Pd deposited on the carrier is 0.001 to 30% by weight, preferably 0.01 to 10% by weight, based on the carrier. If the amount of Pd supported is too small, the supported catalyst must be used in a great quantity in the reaction. Consequently, the viscosity of the reaction system becomes so high that it is difficult to stir. Hence, the catalyst is not effectively used. On the other hand, if the amount of Pd supported on the carrier is too large, dispersion of the metals on the carrier becomes poor, and the diameter of the metal particles increases to reduce the catalytic activity of the resulting catalyst.

The atomic ratio of the metal supported together with Pd to Pd is in the range of from 0.001 to 50, preferably from 0.005 to 10.

The amount of the supported catalyst used is in the range of 5 to 2000 ppm, preferably 10 to 1000 ppm, calculated as Pd based on the polymer. Amounts larger than 2000 ppm may be used, but are not economically feasible.

The conjugated diene polymer used in this invention is composed of 10 to 100% by weight of a conjugated diene monomer unit and 90 to 0% by weight of an ethylenically unsaturated monomer unit. Specific examples of the conjugated diene monomer are 1,3-butadiene, 2,3-dimethylbutadiene, isoprene and 1,3-pentadiene. specific examples of the ethylenically unsaturated monomer include unsaturated nitriles such as acrylonitrile and methacrylonitrile; monovinylidene aromatic hydrocarbons such as styrene, (o-, m- and p-) alkylstyrenes; unsaturated carboxylic acids and the esters thereof, such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate.

The conjugated diene polymer may be the one prepared by any method of preparation, such as emulsion polymerization, solution polymerization or bulk polymerization. Specific examples of the conjugated diene polymer include polyisoprene, polybutadiene, a styrene/butadiene (random or block) copolymer, an acrylonitrile/butadiene (random or blocked) copolymer, a butadiene/isoprene copolymer, and an isoprene-isobutylene copolymer.

The conjugated diene polymer may be hydrogenated as such. Good results, however, can be obtained when the polymer is used in the form of a solution. The concentration of the polymer solution is 1 to 70% by weight, preferably 1 to 40% by weight. Any solvent which does not adversely affect the catalyst and can dissolve the polymer to be hydrogenated may be used to provide the polymer solution. There may usually be employed benzene, toluene, xylene, hexane, cyclohexane, tetrahydrofuran, acetone, methyl ethyl ketone, ethyl acetate, and cyclohexanone. When the polymer is prepared by a solution-polymerization method, the resulting solution may be used as such for hydrogenation.

The hydrogenation reaction is carried out in an autoclave. The reaction temperature is 0° to 300° C., preferably 20° to 150° C. Temperatures of not more than 150° C. are preferred in order to ensure proceeding of selective hydrogenation and inhibit undesirable side-reactions. The pressure of hydrogen is not particularly limited. Usually, it is from atmospheric pressure to 300 kg/cm², preferably 5 to 200 kg/cm². Pressures higher than 300 kg/cm² are not feasible in view of the equipment and operation of the reaction.

The hydrogenated polymer has excellent weatherability, ozone resistance, heat resistance and cold climate resistance, and can be used in a wide range of fields.

The following Examples illustrate the present invention more specifically.

EXAMPLE 1

An acrylonitrile/butadiene copolymer was hydrogenated using a catalyst having supported on an active carbon carrier Pd, Pd/Na, Pd/Ca, Pd/Sc, Pd/Ti or Pd/V. In the two-component systems, the atomic ratio of the respective metal to Pd was 1:1. In any of the catalysts, the amount of Pd was 1% by weight based on the carrier.

Preparation of the catalyst

Activated carbon was dipped in an aqueous solution of each of $PdCl_2$, $PdCl_2/NaCl$, $PdCl_2/CaCl_2$, $PdCl_2/ScCl_3$, $PdCl_2/TiCl_4$, and $PdCl_2/VCl_4$ to impregnate the aqueous solution fully in the activated carbon. The impregnated carbon carrier was subjected to reduction with formaldehyde-sodium hydroxide to prepare a carrier-supported catalyst.

Procedure of the hydrogenation

A 100 ml autoclave was charged with a solution of 3 g of an acrylonitrile/butadiene copolymer (the amount of bonded acrylonitrile 41.1% by weight; $ML_{1+4}$, 100° C.=53; abbreviated NBR) in 17 g of acetone and 0.075 g of the supported catalyst (corresponding to 2.5 parts by weight per 100 parts by weight of the polymer). The inside of the autoclave was purged with nitrogen, and pressurized with hydrogen to 50 kg/cm². The polymer was thus hydrogenated at 50° C. for 4 hours.

Separately the same autoclave was charged with a solution of 3 g of polybutadiene (cis-1,4-content 98%; $ML_{1+4}$ 100° C.=40; abbreviated BR) in 27 g of cyclohexane and the same amount of the same supported catalyst as above. The inside of the autoclave was purged with nitrogen, and pressurized with hydrogen to 50 kg/cm². Thus, the polymer was hydrogenated at 90° C. for 4 hours.

The results are shown in Table 1. Infrared absorption spectroscopy showed no reduction of the nitrile group.

TABLE 1

| | | Catalyst | | |
|---|---|---|---|---|
| Run | Polymer | Type | Amount in parts by weight per 100 parts by weight of the polymer | Degree of hydrogenation (%)* |
| Comparison | NBR | Pd | 2.5 | 68.1 |
| Invention | NBR | Pd-Na | 2.5 | 88.5 |
| | NBR | Pd-Ca | 2.5 | 95.3 |
| | NBR | Pd-Sc | 2.5 | 81.7 |
| | NBR | Pd-Ti | 2.5 | 94.7 |

TABLE 1-continued

| | | Catalyst | | |
|---|---|---|---|---|
| Run | Polymer | Type | Amount in parts by weight per 100 parts by weight of the polymer | Degree of hydrogenation (%)* |
| | NBR | Pd-V | 2.5 | 92.6 |
| Comparison | BR | Pd | 2.5 | 52.4 |
| Invention | BR | Pd-Ca | 2.5 | 73.3 |
| | BR | Pd-Ti | 2.5 | 72.9 |

*Measured by the iodine value method.

EXAMPLE 2

Catalysts were prepared in the same way as in Example 1 except that Zr was used as a metal to be deposited together with Pd. $ZrCl_4$ was used as a source of Zr. The atomic ratio of Zr to Pd was adjusted to 0.1, 0.5, 1, 2 and 10, respectively. Using each of the supported catalysts, the same NBR as used in Example 1 was hydrogenated under the same conditions as in Example 1. The amount of Pd supported in these catalysts was 1% by weight based on the activated carbon. In all runs, reduction of the nitrile group was not noted.

TABLE 2

| Run | Zr-Pd atomic ratio | Amount of the catalyst (parts by weight per 100 parts by weight of the polymer) | Degree of hydrogenation (%)* |
|---|---|---|---|
| Comparison | Pd alone | 2.5 | 67.7 |
| | 0.1 | 0.63 | 97.8 |
| | 0.5 | 0.63 | 96.5 |
| Invention | 1 | 1.25 | 94.5 |
| | 2 | 2.5 | 83.0 |
| | 10 | 2.5 | 75.4 |

*Measured by the iodine method.

EXAMPLE 3

The same BR as used in Example 1, a styrene/butadiene random copolymer (the amount of bonded sytrene 23.5% by weight; $ML_{1+4}$, 100° C.=50; abbreviated SBR), and polyisoprene (cis-1,4 content 97%; $ML_{1+4}$, 100° C.=80; abbreviated IR) were each dissolved in cyclohexane in a concentration of 10% by weight. Each of these polymers in solution was hydrogenated under the same conditions as in the hydrogenation of BR in Example 1 using the supported catalyst prepared in Example 2 (Zr/Pd atomic ratio=0.5; 1% by weight of Pd deposited on activated carbon). The amount of the catalyst was 2.5 parts by weight per 100 parts by weight of the polymer.

The results are shown in Table 3. In the SBR run, hydrogenation of the benzene ring was not noted.

TABLE 3

| Run | Polymer | Catalyst | Degree of hydrogenation (%) |
|---|---|---|---|
| Comparison | BR | Pd | 52.4 |
| Invention | | Pd-Zr | 78.3 |
| Comparison | SBR | Pd | 70.3 |
| Invention | | Pd-Zr | 85.7 |
| Comparison | IR | Pd | 39.2 |
| Invention | | Pd-Zr | 52.9 |

EXAMPLE 4

An acrylonitrile/butadiene copolymer was hydrogenated using a catalyst having supported on an activated carbon carrier Pd alone, and both Pd and B, Al, Ga, Ge, Sb, MO or W. In the two-component systems, the atomic ratio of the respective metal to Pd was 1:1. The amount of Pd deposited on the carrier was 1% in any of these catalysts.

Preparation of the catalyst

Activated carbon was dipped in an aqueous solution of the chlorides of these metals to impregnate them fully in the activated carbon. Reduction with formaldehyde-sodium hydroxide afforded a carrier-supported catalyst.

Procedure of the hydrogenation

A 100 ml autoclave was charged with a solution of 3 g of an acrylonitrile-butadiene random copolymer (the amount of bonded acrylonitrile 41.1% by weight; $ML_{1+4}$, 100° C.=53; abbreviated NBR) in 17 g of acetone and 0.075 g of the supported catalyst (corresponding to 2.5 parts by weight per 100 parts by weight of the polymer). The inside of the autoclave was purged with nitrogen, and then pressurized with hydrogen to 50 kg/cm². Thus, the polymer was hydrogenated at 50° C. for 4 hours.

The results are shown in Table 4. In all runs, reduction of the nitrile group was not noted.

TABLE 4

| Run | Catalyst | Degree of hydrogenation (wt. %) |
|---|---|---|
| Comparison | Pd | 67.6 |
|  | Pd-B | 90.4 |
|  | Pd-Al | 92.2 |
|  | Pd-Ga | 76.3 |
| Invention | Pd-Ge | 93.9 |
|  | Pd-Sb | 94.3 |
|  | Pd-Mo | 91.3 |
|  | Pd-W | 89.7 |

EXAMPLE 5

In the same way as in Example 4, a catalyst having supported on an activated carbon Pd alone or Pd and Al (atomic ratio 1:1) was prepared.

A 100 ml autoclave was charged with a solution of 3 g of polybutadiene (cis-1,4-content 98%; $ML_{1+4}$, 100° C.=40) in 27 g of cyclohexane and each of the catalyst prepared. The inside of the autoclave was purged with nitrogen, and pressurized to 50 kg/cm² with hydrogen. Thus, the polymer was hydrogenated at 90° C. for 4 hours. The amount of the catalyst was 3 parts by weight per 100 parts by weight of the polymer.

The results are shown in Table 5.

TABLE 5

| Run | Catalyst | Degree of hydrogenation (%) |
|---|---|---|
| Comparison | Pd | 60.3 |
| Invention | Pd-Al | 80.2 |

What we claim is:

1. In a process which comprises catalytically hydrogenating the carbon-carbon double bonds of an unsaturated polymer prepared from 10 to 100% by weight of a conjugated diene monomer unit and 90 to 0% by weight of an ethylenically unsaturated monomer unit, the improvement which comprises using a catalyst composed of a porous powdery or granular carrier having supported thereon both Pd and at least one metal selected from the group consisting of the metals of Groups Ia, IIa, IVa, and VA of the periodic table, Ge Sb, Sc, B, Al, Ga, W and Mo.

2. The process of claim 1 wherein the carrier is silica, silicaalumina, alumina, diatomaceous earth, activated carbon or carbon black.

3. The process of claim 1 wherein the atomic ratio of said at least one metal to Pd is in the range of from 0.001 to 50.

4. The process of claim 1 wherein the amount of Pd deposited is 0.001 to 30% by weight based on the weight of the carrier.

5. The process of claim 1 wherein the amount of the catalyst is 5 to 2000 ppm calculated as Pd based on the weight of the polymer.

* * * * *